(12) United States Patent
Nakama

(10) Patent No.: US 6,888,681 B2
(45) Date of Patent: May 3, 2005

(54) OPTICAL DEMULTIPLEXER

(75) Inventor: Kenichi Nakama, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 199 days.

(21) Appl. No.: 10/353,981

(22) Filed: Jan. 30, 2003

(65) Prior Publication Data

US 2003/0151824 A1 Aug. 14, 2003

(30) Foreign Application Priority Data

Jan. 31, 2002 (JP) .................................... P2002-023686

(51) Int. Cl.[7] .......................... G02B 27/30; G02B 5/18
(52) U.S. Cl. ..................................... 359/641; 359/569
(58) Field of Search ........................... 359/641, 558, 359/563, 569–574, 710; 398/68, 84, 87, 88; 385/27, 34

(56) References Cited

U.S. PATENT DOCUMENTS 6,560,020 B1 * 5/2003 Kramer ...................... 359/569
6,690,002 B2    2/2004 Kuroda et al.
2002/0131732 A1  9/2002 Nakama et al.

FOREIGN PATENT DOCUMENTS

JP          P2002-50778 AA    8/2002

* cited by examiner

Primary Examiner—Georgia Epps
Assistant Examiner—Alicia M. Harrington
(74) Attorney, Agent, or Firm—Whitham, Curtis & Christofferson, P.C.

(57) ABSTRACT

Incident light rays (11) given from an optical fiber (10) are converted into parallel light rays (12) by a collimator lens (2). The parallel light rays (12) are demultiplexed in accordance with wavelengths by a diffraction grating (3). After the demultiplexed light rays arrive at the collimator lens (2) again, the light rays are converted into convergent light rays (14) and converged into a photo acceptance element array. Because the converging/image-forming positions of respective channels are arranged at irregular pitches in accordance with wavelengths, signals of the channels can be taken out accurately and efficiently from photo acceptance elements respectively when the photo acceptance elements are provided in the converging/image-forming positions respectively.

5 Claims, 4 Drawing Sheets

OPTICAL DEMULTIPLEXER

BACKGROUND OF THE INVENTION

The present invention relates to an optical demultiplexer and particularly to an optical demultiplexer used for wavelength multiplexing optical communication.

In an optical demultiplexer used for wavelength multiplexing optical communication in the related art, photo acceptance elements or the like are arranged at wavelength intervals of $\Delta\lambda$ in accordance with channels standardized by the International Telecommunication Union-Telecommunication Standardization Sector (ITU-T). Parallel light rays incident onto a diffraction grating are decomposed into parallel pencils of rays having different diffraction angles in accordance with wavelengths by the wavelength dispersion function of the diffraction grating. The parallel pencils of rays are converged and image-formed into different positions in accordance with wavelengths by a light collimating element such as a lens. The photo acceptance elements are arranged in the converging/image-forming positions respectively, so that optical signals corresponding to channels are output from the photo acceptance elements respectively.

On this occasion, it is necessary to make the pitch $\Delta S$ between the converging/image-forming positions coincident with the pitch $\Delta P$ between the photo acceptance elements in order to obtain the function of the optical demultiplexer used for wavelength multiplexing optical communication. Generally, the focal length f of the light collimating element is decided on the basis of the following expression (1) of reciprocal linear dispersion of the diffraction grating so that the converging/image-forming pitch can be obtained to be matched with the photo acceptance element pitch.

$$D = \cos\beta/Nmf = \Delta\lambda/\Delta S = \Delta\lambda/\Delta P \quad (1)$$

in which D is the quantity of wavelength dispersion (reciprocal linear dispersion) per unit length, $\beta$ is the angle of diffraction, N is the number of grooves in the diffraction grating, and m is the order of diffraction.

In the expression (1), the diffraction angle $\beta$ is decided by substituting the relation $\lambda = \lambda c$ ($\lambda c$ is the wavelength used) and the angle $\alpha$ incident onto the diffraction grating into the following expression (2) of the diffraction grating.

$$\sin\alpha + \sin\beta = Nm\lambda \quad (2)$$

Generally, when the diffraction angle $\beta$ in a wavelength $\lambda c$ used optionally is small, $\cos\beta$ in the expression (1) is approximately equal to 1 (constant). Hence, even in the case where the used wavelength $\lambda c$ changes in accordance with the change of the used channel so that the diffraction angle $\beta$ changes on the basis of the expression (2), $\Delta\lambda/\Delta S$ becomes constant because the left side ($\cos\beta/Nmf$) of the expression (1) is constant. Hence, the design method in the related art has no practical problem in this condition. (See Japanese patent publication P2002-50778A, and U.S. patent application Ser. No. 09/915,477.)

On the other hand, in the demultiplexer used for narrow-band wavelength multiplexing optical communication, it is necessary to make the dispersion performance of the diffraction grating high. Hence, it is desirable that the number of grooves in the diffraction grating is increased so that the demultiplexer is used in a place where $\sin\beta$ takes a large value. When the demultiplexer is used in this condition, the reciprocal linear dispersion D, however, varies in accordance with the used wavelength $\lambda c$ because $\cos\beta$ is not approximately equal to 1. As a result, the pitch $\Delta S$ between the converging/image-forming positions changes. Hence, there is a problem that optical signals of respective channels cannot be accepted by the photo acceptance elements if the pitch $\Delta P$ between the photo acceptance elements is not changed in accordance with the change of $\Delta S$.

As measures to solve this problem, there may be conceived a method using photo acceptance elements arranged at such irregular pitches as follows. That is, the pitch $\Delta P$ between the photo acceptance elements is changed in such a manner that the converging/image-forming position pitch $\Delta S$ between adjacent channels is corrected on the basis of the reciprocal linear dispersion D calculated by the expression (1) in accordance with each channel. This method is however based on linear calculation using $\cos\beta$ as a constant for adjacent channels even in the case where the wavelength $\lambda$ changes from $\lambda c$ to $\lambda c + \Delta\lambda$ so that the diffraction angle $\beta$ changes from $\beta c$ to $\beta c + \Delta\beta$. For this reason, when the dispersion performance of the diffraction grating needs to be made high as described above, $\Delta\beta$ increases with increase in number of grooves. In this case, if the diffraction angle is taken large, $\beta c$ becomes large. As a result, there is a problem that unacceptable error occurs in a narrow-band multi-channel optical demultiplexer.

The invention is provided in consideration of the problems in the related art. An object of the invention is to provide an optical demultiplexer in which converging/image-forming positions of channels are made coincident with positions of photo acceptance elements respectively so that respective signals of the channels can be taken out from the photo acceptance elements efficiently and accurately even in the case where the optical demultiplexer is a narrow-band multi-channel optical demultiplexer.

SUMMARY OF THE INVENTION (1) To achieve the foregoing object, in accordance with the invention, there is provided an optical demultiplexer including: a light input unit for inputting incident light rays having a plurality of optical signals different in wavelength as a multiplex signal; a light collimating element for converting the incident light rays input by the light input unit into parallel light rays; a diffraction grating for demultiplexing the parallel light rays collimated by the light collimating element in accordance with wavelengths; and a plurality of photo acceptance units provided in different positions where a plurality of light rays at different wavelengths demultiplexed by the diffraction grating are converged and image-formed in accordance with the wavelengths by the collimating element; wherein distances $h_1(\lambda_0), h_1(\lambda_1), \ldots, h_1(\lambda_n)$ between an optical axis of the collimating element and optical axes of the plurality of photo acceptance units in accordance with the demultiplexed wavelengths satisfy the expression:

$$h_1(\lambda_j) = f \tan(\sin^{-1}(Nm\lambda_j - A) - \theta g)$$

in which j is an integer of 0 to n, A is equal to $\sin(\theta g + \tan^{-1}(h_0/f))$, f is the focal length of the light collimating element, $\theta g$ is the angle between the optical axis of the light collimating element and a line normal to a diffraction surface of the diffraction grating, $h_0$ is the distance between the light input unit and the optical axis of the light collimating element, N is the number of grooves in the diffraction grating, m is the order of diffraction, and $\lambda_0, \lambda_1, \ldots, \lambda_n$ are the demultiplexed wavelengths.

(2) Preferably, in the optical demultiplexer as in (1), the photo acceptance units and the light input unit are provided in Littrow arrangement through the light collimating element.

(3) Preferably, in the optical demultiplexer as in (1) or (2), the light collimating element is either lens or mirror.

(4) Preferably, in the optical demultiplexer as in any one of (1) through (3), the photo acceptance units are formed so that photo acceptance region width $w_p(\lambda_j)$ of the photo acceptance units accepting light rays at wavelengths $\lambda_j$ in directions perpendicular to the grooves of the diffraction grating satisfy the expression:

$$w_p(\lambda_j) = [\{h_1(\lambda_j) - h_1(\lambda_{j-1})\} \times \{d\lambda_j/(\lambda_j - \lambda_{j-1})\} + \{h_1(\lambda_{j+1}) - h_1(\lambda_j)\} \times \{d\lambda_j/(\lambda_{j+1} - \lambda_j)\}]/2$$

in which j is an integer of 0 to n, and $d\lambda_j$ is a wavelength band accepted by each photo acceptance unit.

(5) Preferably, in the optical demultiplexer, each of the photo acceptance units is either photo acceptance element or optical fiber.

The present disclosure relates to the subject matter contained in Japanese patent application No. P2002-23686 (filed on Jan. 31, 2002), which is expressly incorporated herein by reference in its entirety.

DESCRIPTION OF THE PREFERRED EMBODIMENT

Figure 1:
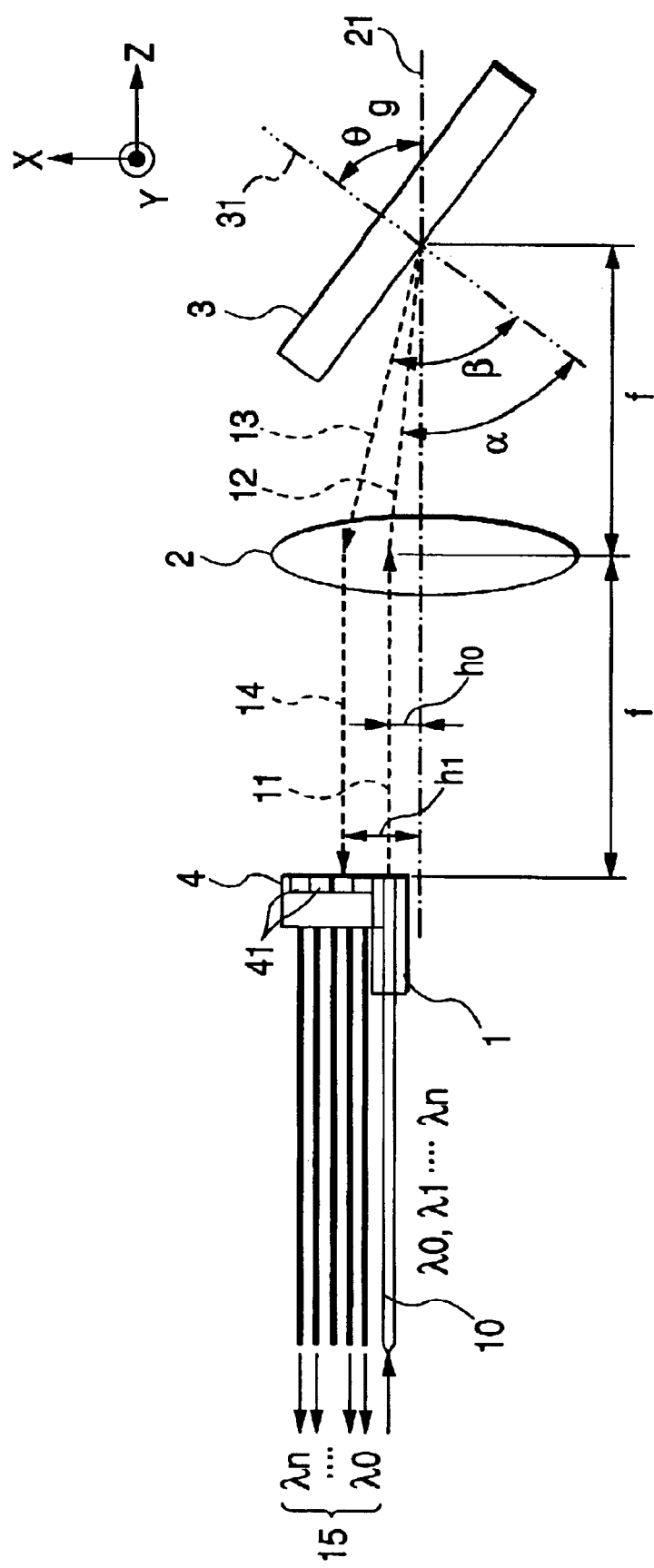
FIG. 1 is a view showing the configuration of an optical demultiplexer according to an embodiment of the invention.
Figure 2:
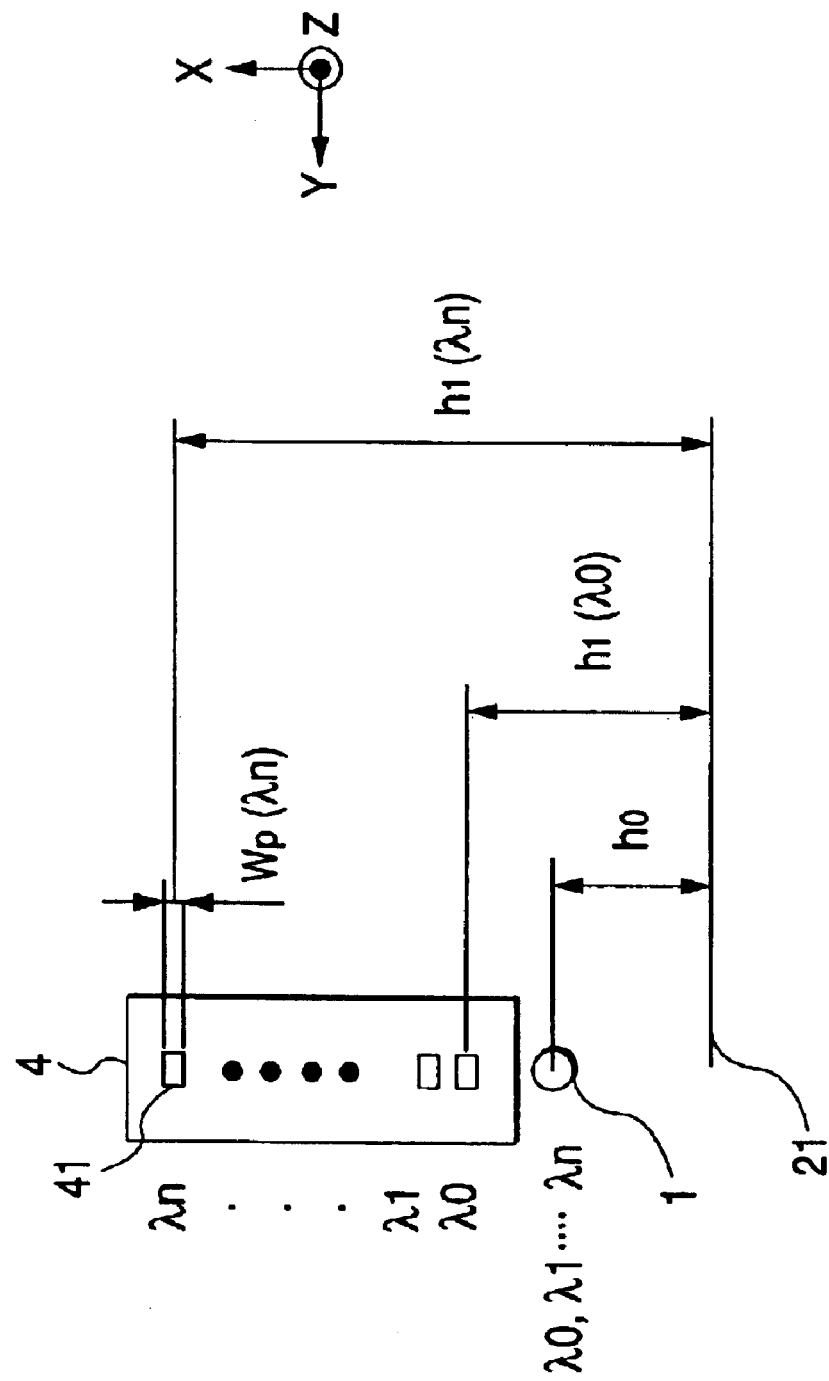
FIG. 2 is a plan view of a photo acceptance element array according to the embodiment.

An embodiment of the invention will be described below with reference to the drawings. FIGS. 1 and 2 show an optical demultiplexer according to this embodiment. As shown in FIG. 1, the optical demultiplexer according to this embodiment has an optical fiber chip 1 as a light input unit, a collimator lens 2 as a light collimating element, and a photo acceptance element array 4 as a plurality of photo acceptance units. The optical fiber chip 1 and the photo acceptance element array 4 are disposed in a position far by the focal length f from the collimator lens 2 and form Littrow arrangement with respect to a diffraction grating 3. The diffraction grating 3 is disposed in a position far by f from the collimator lens 2 in a direction opposite to the optical fiber chip 1 and the photo acceptance element array 4. An optical fiber 10 is provided in the optical fiber chip 1. The photo acceptance element array 4 has photo acceptance elements 41 corresponding in number with signals incident onto the photo acceptance element array 4 from the optical fiber 10.

Next, the operation of the optical demultiplexer in this embodiment will be described. A wavelength multiplexing optical communication signal incident onto the optical fiber 10 and containing a number of, n+1 (n is an integer), multiplexed signals at wavelengths $\lambda_0, \lambda_1, \ldots, \lambda_n$ is radiated as incident divergent light rays 11 from a fiber end of the optical fiber chip 1 to a space. Because the optical fiber chip 1 is disposed in a focal plane of the collimator lens 2, the incident divergent light rays 11 reaching the collimator lens 2 are converted into incident parallel light rays 12 and made incident onto the diffraction grating 3. On this occasion, because the incident parallel light rays 12 are propagated at an angle of $\tan^{-1}(h_0/f)$ with respect to the optical axis 21 of the collimator lens 2, the angle α of incidence onto the diffraction grating 3 is given by the expression (3):

$$\alpha = \theta g + \tan^{-1}(h_0/f) \quad (3)$$

in which θg is the angle between a line 31 normal to the diffraction grating 3 and the optical axis 21 of the collimator lens 2, and $h_0$ is the distance between the optical axis 21 of the collimator lens 2 and the optical fiber chip 1.

The incident parallel light rays 12 incident onto the diffraction grating 3 are converted into parallel light rays 13 diffracted at a diffraction angle β given by the expression (2) in accordance with the wavelengths $\lambda_0, \lambda_1, \ldots, \lambda_n$. The diffracted parallel light rays 13 are propagated along the optical axis 21 in a direction reverse to the incident parallel light rays 12. After the diffracted parallel light rays 13 reach the collimator lens 2 again, the diffracted parallel light rays 13 are converted into diffracted convergent light rays 14 and collected onto the photo acceptance element array 4. From the expression (2), the diffraction angle $\beta(\lambda_j)$ at an optional wavelength $\lambda_j$ is given by the following expression (4).

$$\beta(\lambda_j) = \sin^{-1}(Nm\lambda_j - \sin \alpha) \quad (4)$$

The distance $h_1(\lambda_j)$ between the converging position of the diffracted convergent light rays 14 at the wavelength $\lambda_j$ and the optical axis 21 of the collimator lens 2 is given by the following expression (5).

$$h_1(\lambda_j) = f \tan(\beta(\lambda_j) - \theta g) \quad (5)$$

When the expressions (3) and (4) are substituted into the expression (5), $h_1(\lambda_j)$ is given by the expression (6):

$$h_1(\lambda_j) = f \tan(\sin^{-1}(Nm\lambda_j - A) - \theta g) \quad (6)$$

in which j is an integer of 0 to n, and A is equal to $\sin(\theta g + \tan^{-1}(h_0/f))$.

Accordingly, when the photo acceptance elements 41 of the photo acceptance element array 4 are disposed in positions of $h_1(\lambda_j)$ given by the expression (6) in accordance with the wavelengths $\lambda_0, \lambda_1, \ldots, \lambda_n$ respectively as shown in FIG. 2, the converging/image-forming positions of the channels can be made coincident with the positions of the photo acceptance elements respectively even in the case where the optical demultiplexer is a narrow-band multichannel optical demultiplexer. Hence, the optical demultiplexer can be achieved as an optical demultiplexer in which signals of the channels can be taken out accurately and efficiently from the photo acceptance elements respectively.

When the expression (6) is used, the width (i.e., photo acceptance region width) $w_p(\lambda_j)$ of each photo acceptance element 41 for accepting the wavelength $\lambda_j$ can be given, in accordance with the photo acceptance element pitch varying according to the wavelength, by the expression (7):

$$w_p(\lambda_j) = [\{h_1(\lambda_j) - h_1(\lambda_{j-1})\} \times \{d\lambda_j/(\lambda_j - \lambda_{j-1})\} + \{h_1(\lambda_{j+1}) - h_1(\lambda_j)\} \times \{d\lambda_j/(\lambda_{j+1} - \lambda_j)\}]/2 \quad (7)$$

in which j is an integer of 0 to n, and $d\lambda_j$ is a wavelength band accepted by each photo acceptance element 41.

In this manner, the width $w_p(\lambda_j)$ of each photo acceptance element 41 for accepting the wavelength $\lambda_j$ can be changed on the basis of the expression (7) in accordance with the photo acceptance element pitch changed in accordance with the wavelength. Hence, a wavelength band of light received in any position can be extracted stably and accurately with a desired width.

(Embodiment 1)

In this embodiment, the channel pitch was set at 100 GHz, the number of channels was set at 40 (from channel No. 0 to channel No. 39), the frequency range was set to be 192.0 to 196.0 THz (wavelength range: 1529.55 to 1561.42 nm), the focal length of the collimator lens was set at 48.775 mm, the number of grooves in the diffraction grating was set at 892 /mm, the order of diffraction was set at 1, the distance between the optical fiber and the optical axis of the collimator lens was set at 1 mm, the inclination angle θg of the diffraction grating was set at 41.5°, and the acceptance bandwidth was set to be in a range of ±1/10 of the channel pitch, that is, in a range of 20% of the channel pitch. A lens with zero distortion aberration was used as the collimator lens.

Figure 3:
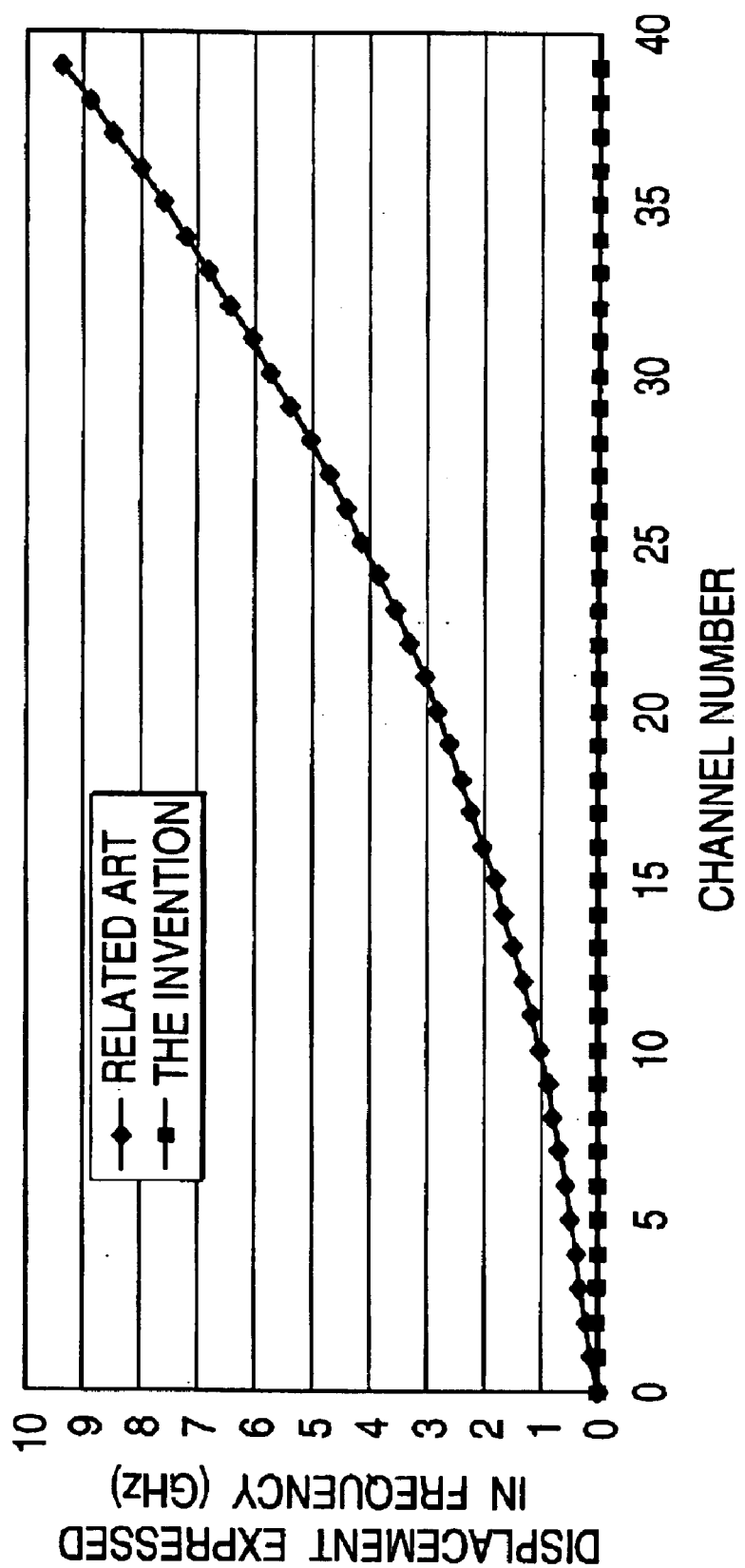
FIG. 3 is a graph showing a result of displacement expressed in frequency.

FIG. 3 shows results of displacement of the photo acceptance elements from the converging spot positions in accordance with the channels in the case where the displacement is expressed in frequency. Incidentally, the frequency is given by c/λ when c is the velocity of light. It is obvious from the results that when pitch correction is made by the related-art method using cosβ/Nmf, displacement of 9.5 GHz occurs in channel No. 39 because displacement of the photo acceptance elements from the converging spot positions becomes remarkable as the number of channels increases (i.e., as the frequency becomes lower and the wavelength becomes longer). Hence, it is obvious that almost of tolerance is spent for the uncertainty of irregular pitches of the photo acceptance elements in ITU-T standards (in which the bandwidth is in a range of ±10% of the channel pitch, for example, ±10 GHz in the case where the channel pitch is 100 GHz).

On the other hand, it is obvious that the displacement in this embodiment is so little that each converging spot can be accepted accurately and efficiently.

(Embodiment 2)

Figure 4:
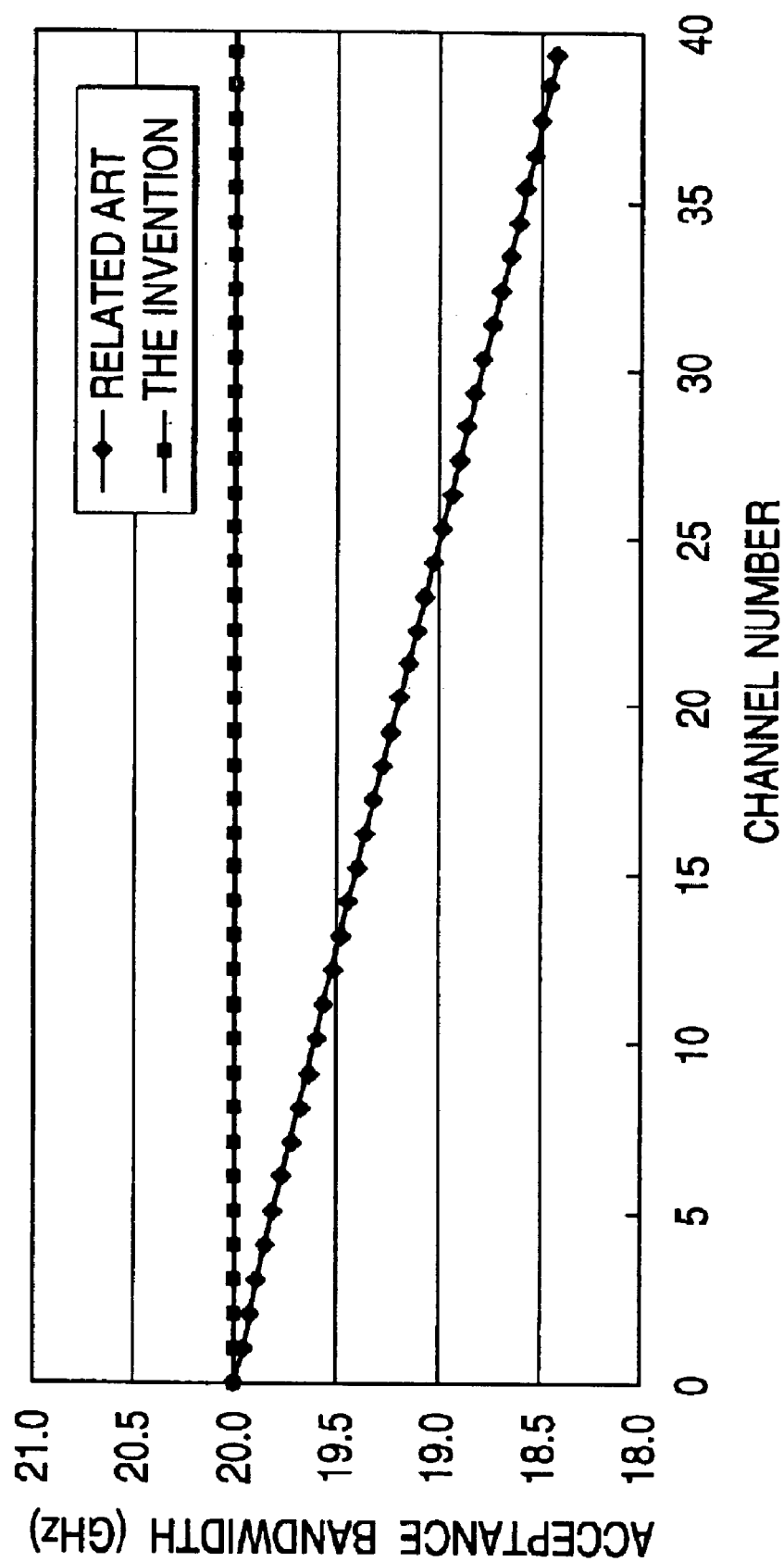
FIG. 4 is a graph showing a result of acceptance bandwidth.

FIG. 4 shows results of acceptance bandwidths in accordance with the channels in the same condition as in Embodiment 1 in the case where each acceptance region width is expressed in frequencyband. It is obvious from FIG. 4 that when pitch correction is made by the related-art method, a uniform acceptance bandwidth in all the channels cannot be achieved because the acceptance bandwidth becomes narrower than that according to ITU-T standards (in which the bandwidth is in a range of ±10% of the channel pitch, for example, ±10 GHz in the case where the channel pitch is 100 GHz) as the number of channels increases. For example, in channel No.39, the acceptance bandwidth is narrower by 1.6 GHz than the defined value of 20 GHz, that is, the acceptance bandwidth is 18.4 GHz.

On the other hand, it is obvious that the acceptance bandwidth of each channel in this embodiment is always kept equal to the defined value of 20 GHz so that each converging spot can be accepted accurately and efficiently.

It is obvious from these results that signals of respective channels can be extracted from the photo acceptance elements respectively accurately and efficiently even in the case where this embodiment is applied to a narrow-band multi-channel optical demultiplexer which cannot be achieved in the related art.

Although this embodiment has been described on the base where a photo acceptance element array 4 is used as a plurality of photo acceptance units, the invention may be also applied to the case where the photo acceptance element array 4 is replaced by an optical fiber array. In this case, optical fibers for accepting light rays of channels respectively are arranged in converging/image-forming positions in accordance with the channels respectively.

As described above, in accordance with the invention, the converging/image-forming positions of channels can be made coincident with the positions of photo acceptance units respectively even in a narrow-band multi-channel optical demultiplexer. Hence, there can be provided an optical demultiplexer in which respective signals of the channels can be extracted accurately and efficiently from the photo acceptance units respectively.

What is claimed is:

1. An optical demultiplexer comprising:
   a light input unit for inputting incident light rays having a plurality of optical signals different in wavelength as a multiplex signal;
   a light collimating element for converting said incident light rays input by said light input unit into parallel light rays;
   a diffraction grating for demultiplexing said parallel light rays collimated by said light collimating element in accordance with wavelengths; and
   a plurality of photo acceptance units provided in different positions where a plurality of light rays at different wavelengths demultiplexed by said diffraction grating are converged and image-formed in accordance with the wavelengths by said collimating element;
   wherein distances $h_1(\lambda_0), h_1(\lambda_1), \ldots, h_1(\lambda_n)$ between an optical axis of said light collimating element and optical axes of said plurality of photo acceptance units in accordance with the demultiplexed wavelengths satisfy an expression:

$$h_1(\lambda_j) = f \tan(\sin^{-1}(Nm\lambda_j - A) - \theta g)$$

in which j is an integer of 0 to n, A is equal to $\sin(\theta g + \tan^{-1}(h_0/f))$, f is a focal length of said light collimating element, θg is an angle between the optical axis of said light collimating element and a line normal to a diffraction surface of said diffraction grating, $h_0$, is a distance between said light input unit and the optical axis of said light collimating element, N is a number of grooves in said diffraction grating, m is order of diffraction, and $\lambda_0, \lambda_1, \ldots, \lambda_n$ are demultiplexed wavelengths.

2. An optical demultiplexer according to claim 1, wherein said photo acceptance units and said light input unit are provided in Littrow arrangement through said light collimating element.

3. An optical demultiplexer according to claim 1, wherein said light collimating element is one of a lens and a mirror.

4. An optical demultiplexer according to claim 1, wherein said photo acceptance units are formed so that photo acceptance region width $w_p(\lambda_j)$ of said photo acceptance units accepting light rays at wavelengths $\lambda_j$ in directions perpendicular to the grooves of said diffraction grating satisfy an expression:

$$w_p(\lambda_j) = [\{h_1(\lambda_j) - h_1(\lambda_{j-1})\} \times \{d\lambda_j / (\lambda_j - \lambda_{j-1})\} + \{h_1(\lambda_{j+1}) - h_1(\lambda_j)\} \times \{d\lambda_j / (\lambda_{j+1} - \lambda_j)\}] / 2$$

in which j is an integer of 0 to n, and $d\lambda_j$ is a wavelength band accepted by each photo acceptance unit.

5. An optical demultiplexer according to claim 1, wherein each of said photo acceptance units is one of a photo acceptance element and an optical fiber.

* * * * *